US006359056B1

(12) United States Patent
Aurenty et al.

(10) Patent No.: US 6,359,056 B1
(45) Date of Patent: Mar. 19, 2002

(54) PRINTING PLATE AND METHOD TO PREPARE A PRINTING PLATE

(75) Inventors: Patrice M. Aurenty, Wood-Ridge; Alexander Grant, Bloomfield; Edward Stone, Morris Plains; Mark J. Lindsey, Hasbrouck Heights, all of NJ (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/492,644

(22) Filed: Jan. 27, 2000

(51) Int. Cl.[7] ........................ C08L 25/04; C08L 33/02; C08K 5/3432; C09K 19/04

(52) U.S. Cl. ........................ 524/556; 524/99; 524/548; 252/299.01

(58) Field of Search ................................ 524/516, 522, 524/523, 548, 555, 556, 99; 430/204; 252/299.01; 428/1.1; 101/451, 452, 457, 463.1, 466

(56) References Cited

U.S. PATENT DOCUMENTS

| | | | | |
|---|---|---|---|---|
| 3,877,272 A | | 4/1975 | Leeds | 101/465 |
| 3,969,264 A | | 7/1976 | Davis | 252/299 |
| 4,278,467 A | | 7/1981 | Fadner | 106/2 |
| 4,343,968 A | | 8/1982 | Toyomura | 178/23 R |
| 4,642,247 A | | 2/1987 | Mouri et al. | 427/214 |
| 4,660,058 A | | 4/1987 | Cordery | 346/140 R |
| 4,854,969 A | | 8/1989 | Bassemir et al. | 106/2 |
| 4,882,081 A | * | 11/1989 | Nichols | 292/182.28 |
| 4,883,486 A | | 11/1989 | Kapadia et al. | 623/13 |
| 4,977,055 A | * | 12/1990 | Kato et al. | 430/114 |
| 5,122,187 A | | 6/1992 | Schwarz et al. | 106/25 |
| 5,135,095 A | | 8/1992 | Kocznar et al. | 194/209 |
| 5,139,696 A | * | 8/1992 | Frechet et al. | 252/299.01 |
| 5,340,619 A | | 8/1994 | Chen et al. | 424/498 |
| 5,368,974 A | | 11/1994 | Walls et al. | 430/156 |
| 5,492,559 A | | 2/1996 | Oliver et al. | 106/22 E |
| 5,506,608 A | | 4/1996 | Marler et al. | 347/18 |
| 5,533,446 A | | 7/1996 | Hashimura et al. | 101/150 |
| 5,551,973 A | | 9/1996 | Oliver et al. | 106/22 |
| 5,599,412 A | | 2/1997 | Faris | 156/73.3 |
| 5,599,595 A | | 2/1997 | McGinley et al. | 428/33 |
| 5,639,511 A | | 6/1997 | Watanabe et al. | 427/162 |
| 5,678,483 A | | 10/1997 | Johnson | 101/153 |
| 5,688,146 A | | 11/1997 | McGinley et al. | 439/637 |
| 5,690,857 A | | 11/1997 | Osterried et al. | 252/299.1 |
| 5,693,375 A | | 12/1997 | Sato et al. | 427/522 |
| 5,700,882 A | * | 12/1997 | Jones et al. | 525/440 |
| 5,716,663 A | | 2/1998 | Capote et al. | 427/96 |
| 5,731,123 A | * | 3/1998 | Kawamura et al. | 430/176 |
| 5,798,147 A | | 8/1998 | Beck et al. | 427/511 |
| 5,805,245 A | | 9/1998 | Davis | 349/20 |
| 5,873,751 A | | 2/1999 | Daly et al. | 439/620 |
| 5,888,679 A | | 3/1999 | Suzuki et al. | 430/7 |
| 5,968,688 A | | 10/1999 | Masuda et al. | 430/7 |
| 6,068,963 A | * | 5/2000 | Aoshima | 430/270.1 |

FOREIGN PATENT DOCUMENTS

| | | | |
|---|---|---|---|
| EP | 503621 | | 9/1992 |
| EP | 0342685 | | 4/1994 |
| EP | 591916 | | 4/1994 |
| EP | 0790509 | | 8/1997 |
| GB | 1298577 | * | 6/1972 |
| GB | 2249794 | * | 5/1992 |
| GB | 2276883 | | 10/1994 |
| JP | 78045721 | | 6/1979 |
| JP | 228233 | | 1/1990 |
| JP | 3248892 | | 11/1991 |
| JP | 5201146 | | 8/1993 |
| JP | 6155735 | | 6/1994 |
| JP | 7266630 | | 10/1995 |
| JP | 911485 | | 1/1997 |
| JP | 9327924 | | 12/1997 |

OTHER PUBLICATIONS

K. Nortake, "Glass Decoration", *JPI Journal*, vol. 26, No. 11, Nov. 1963, pp. 29–34.

Fischbach F., *Dtsch. Drucker*, vol. 23, No. 7, Feb. 26, 1987, pp. w30–w33. (Abstract).

E. Williams, *Financial Times*, No. 30, 225, May 1987, p. 35. (Abstract).

Chen et al., "Binders for Higher–Solids Coatins.IV.Liquid–Crystalline Acrylic Lacquers", *J. Appl. Polym. Sci.*, vol. 36, 1988, pp. 141–163. (Abstract).

R. Chadrasekhar, "Water Based UV Curable Ink–Jet Printing Fluid Containing Encapsulated Liquid Crystal", *J. of Radiation Curing*, Oct. 1988, pp. 6–11.

H. Kamoi, "Functional Ink", May 1989, pp. 15–24.

H. Kamoi, "Special Printing Ink", Jan. 1990, pp. 48–52.

Christie et al., "The Application of Instrumental Colour Measurement Methods to Thermochromic Printing Inks", *Surface Coatings International*, 1995, pp. 332–336.

Yada et al., "Thin–Film Formation of a Positive Photoresist by Spin Coating: Influrence of Substrate Size", *Advanced Technology R & D Center, Mitsubishi Electric Corp.*, Apr. 1997, pp. 47–55.

Tseng et al., "Development of a Multideveloping Photoresist and its Application to Make Liquid Crystal Display Color Filter", *Macromol. Symp. 118*, 1997, pp. 497–503.

Kim et al., "Development of Organic Photoresist for Color Filer Black Matrix", *Mat. Res. Soc. Proc.*, vol. 424, 1997, pp. 329–334.

Lind et al., "Graphic Arts Color Filters for Flat Panel Displays", *Graphic Arts Technology Foundation*, N/D, pp. 703–715.

* cited by examiner

*Primary Examiner*—Vasu Jagannathan
*Assistant Examiner*—Callie Shosho
(74) *Attorney, Agent, or Firm*—Baker Botts L.L.P.

(57) ABSTRACT

A printing plate is prepared by the process comprising: (a) providing a substrate; and (b) applying by ink jetting to the substrate a fluid composition comprising an acidic polymeric compound and a second compound comprising a pyridyl group in non-aqueous solvent, providing a printing plate that is ready-to-use on a press without having to develop it. The printing plate of this invention is capable of extended press run length and advantageously avoids the costly and time-consuming need of chemical development.

23 Claims, No Drawings

PRINTING PLATE AND METHOD TO PREPARE A PRINTING PLATE

FIELD OF THE INVENTION

This invention relates to a printing plate, a method of making a printing plate, and a method of printing using such a plate to form a desired image on a medium. More particularly, the printing plate of this invention employs a printing plate substrate and a fluid composition comprising an acidic polymeric compound and a second compound comprising a pyridyl group, which adhere to a substrate. The fluid composition is applied by ink jetting to the substrate, providing a printing plate that is ready-to-use on a press without having to develop it.

BACKGROUND OF THE INVENTION

The offset lithographic printing process has long used a developed planographic printing plate having oleophilic image areas and hydrophilic non-image areas. The plate is commonly dampened before or during inking with an oil-based ink composition. The dampening process utilizes a fountain solution such as those described in U.S. Pat. Nos. 3,877,372, 4,278,467 and 4,854,969. When water is applied to the plate, the water will form a film on the non-image hydrophilic areas, but will contract into tiny droplets on the oleophilic image areas. When a roller carrying an oil-based ink composition is passed over the dampened plate, it will not ink the non-image areas that are covered by the aqueous film, but will emulsify the water droplets on the water repellant image areas, which will then take up ink. The resulting ink image is transferred, or "offset," onto a rubber blanket, which is then used to print onto a medium such as paper.

It has been proposed to apply "direct" ink jet printing techniques to lithographic printing. For example, European Patent Publication No. 503,621 discloses a direct method to make lithographic plates by jetting a photocurable ink onto the plate substrate, and then exposing the plate to ultraviolet radiation to harden the image area. An oil-based ink may then be transferred to the image area for printing onto a printing medium. But, neither the resolution of ink drops jetted onto the substrate, nor the durability of the lithographic printing plate with respect to printing runlength was disclosed.

It has also been proposed to apply the direct ink jet printing techniques without the additional steps of chemical development of the plate. This approach advantageously results in lower production costs and a more environmentally acceptable printing process. However, in such techniques it is difficult to control the spreading of the droplets of ink jetted fluid that forms the oleophilic ink-accepting regions on the printing plate substrate. Such droplet "dot spreading" causes lower resolution of printed images and reduced image quality. For example, European Patent Application No. 0591,916 A2 discloses a water-based ink having a polymer containing anhydride groups which are thermally cross-linked on the substrate with a hydroxy-functional polymer. This formulation is applied by jetting the formulation, which is at room temperature, onto a room temperature substrate. However, this formulation does not achieve good control of dot spreading.

U.S. Pat. No. 4,833,486 discloses the apparatus and process for imaging a plate with a "hot melt" type of ink jet printer. The image is produced by jetting at high temperature a "phase change" type of ink which solidifies when it hits the cooler substrate. The ink becomes instantaneously solid rather than remaining a liquid or gel which is thereafter cured to form a solid. However, such an ink does not provide good resistance to press run due to the wax-type nature of the ink formulation.

U.S. Pat. Nos. 5,492,559 and 5,551,973 describe an ink jet formulation based on an aqueous phase, an oil phase, an oil soluble dye, and a surfactant, wherein the ink exhibits a liquid crystalline gel phase at one temperature and a liquid microemulsion phase at a higher temperature. However, no component of the composition, standing alone, exhibits liquid crystalline behavior. Further, it is not disclosed that the composition can be ink jetted to make a printing plate with an imaged, ink-receptive layer.

Thus, it would be advantageous to employ a printing plate capable of extended press run length which does not require chemical development.

It is one object of this invention to provide such a fluid composition and printing plate. It is another object of this invention to provide a method of preparing such a printing plate. It is yet another object of this invention to provide a method of using such a printing plate. The printing plate of this invention may advantageously be prepared without a chemical development step typically required. The printing plate of this invention is also capable of extended press run length.

SUMMARY OF THE INVENTION

The fluid composition of this invention is suitable for ink jetting upon a substrate and comprises an acidic polymeric compound combined with a second compound comprising a pyridyl group, the mixture being dissolved in a diglyme or glycolic solution and ink jetted. Alternatively, the mixture may be hot melt ink jetted onto the substrate.

The printing plate of this invention is prepared by: (a) providing a substrate; and (b) applying by ink jetting to the substrate a fluid composition as described. Optionally, a surfactant is applied to at least one surface of the substrate to prepare a "printing plate precursor" upon which the fluid composition is image-wise ink jetted. In a preferred embodiment, the precursor plate surfactant is a fluorosurfactant.

In preferred embodiments, acidic polymeric compounds suitable for this invention are poly(acrylic acid)s, poly(methacrylic acid)s, poly(maleic acid)s, poly(fumaric acid)s, poly(styrene-co-acrylic acid)s, poly(styrene-co-maleic acid)s, poly(styrene-co-fumaric acid)s, and mixtures or derivatives thereof. In a particularly preferred embodiment, the acidic polymeric compound is a poly(acrylic acid) and the second compound is a pyridyl liquid crystal.

The printing plate of this invention is capable of extended press run length and advantageously avoids the need of chemical development.

DETAILED DESCRIPTION OF THE INVENTION

To achieve extended printing runs with printing plates the oleophilic material must adhere well to the substrate. Adhesion of the oleophilic material may be controlled in at least two ways. First, the oleophilic material should have a chemical interaction with the substrate that provides a type of chemical binding and promotes adhesion. For example, the chemical composition of the oleophilic material can be varied to promote its adhesion to the substrate. Also, the composition of the substrate can be varied to increase binding of the oleophilic material. Further, high cohesive strength of the oleophilic material helps to bind it to itself on the substrate, thus improving its adhesion. Cohesive strength of the oleophilic material is enhanced by providing a means for chemical interaction or association between the molecules of the oleophilic material.

The second way that adhesion of the oleophilic material may be controlled is by providing a substrate in which microscopic topology allows the oleophilic material to interlock mechanically with the substrate when dry or hardened. Mechanical interlocking can be affected by roughening the surface of the substrate. Thus, by controlling these variables, a printing plate can be made with increased adhesion of the oleophilic material, and correspondingly longer printing run operation.

In the invention described here, the oleophilic material is placed on the substrate by ink jetting a fluid composition comprising an acidic polymeric compound and a second compound comprising a pyridyl group. Optionally, by pretreating the substrate surface with a surfactant to lower its surface tension, the spreading of droplets of fluid composition is reduced. Thus, by these and other features inherent in the composition and method described here, excellent printing resolution can be obtained, as well as long-lasting adhesion of the dried oleophilic material to the substrate.

The printing plate of this invention encompasses lithographic printing plates, flexographic printing plates, and gravure printing plates.

Conventional printing plate substrates such as aluminum, polymeric film, and paper may be used as the printing plate substrate of this invention. The printing plate substrate may be subjected to treatments such as electrograining, anodization, and silication to enhance its surface characteristics. The surface characteristics that are modified by such treatments are roughness, topology, and the nature and quantity of surface chemical sites.

Substrates that can be employed are given in Table 1. Substrates chosen for use in this invention are preferably based on aluminum oxide, and may be subjected to various conventional surface treatments as are well known to those skilled in the art to give a surface that has either acidic or basic character in the Bronsted acid-base view. These treatments also result in different surface roughness, topology, and surface chemical sites, as summarized in Table 1.

TABLE 1

Substrates for printing plates

| Substrate name | Surface Treatment | Interlayer Treatment | Surface Property |
|---|---|---|---|
| AA | Quartz Grained and Anodized | None | Acidic |
| EG-PVPA | Electrograined and Anodized | Polyvinyl phosphoric acid | Acidic |
| PF | Electrograined and Anodized | Sodium dihydrogen phosphate/Sodium fluoride | Acidic |
| G20 | Electrograined and Anodized | Vinylphosphonic acid/acryTamide copolymer | Acidic/ Amphoteric |
| EG-Sil | Electrograined and Anodized | Sodium Silicate | Basic |
| DS-Sil | Chemically Grained and Anodized | Sodium Silicate | Basic |
| PG-Sil | Pumice Grained and Anodized | Sodium Silicate | Basic |
| CHB-Sil | Chemically Grained, Anodized and Silicated | Sodium Silicate | Basic |

"AA" means "as anodized." The aluminum surface is first quartz grained and then anodized using DC current of about 8 A/cm$^2$ for 30 seconds in a $H_2SO_4$ solution (280 g/liter) at 30° C.

"EG" means "electrolytic graining." The aluminum surface is first degreased, etched and subjected to a desmut step (removal of reaction products of aluminum and the etchant). The plate is then electrolytically grained using an AC current of 30–60 A/cm$^2$ in a hydrochloric acid solution (10 g/liter) for 30 seconds at 25° C., followed by a post-etching alkaline wash and a desmut step. The grained plate is then anodized using DC current of about 8 A/cm$^2$ for 30 seconds in a $H_2SO_4$ solution (280 g/liter) at 30° C.

"PVPA" is a polyvinylphosphonic acid. The plate is immersed in a PVPA solution and then washed with deionized water and dried at room temperature.

"DS" means "double sided smooth." The aluminum oxide plate is first degreased, etched or chemically grained, and subjected to a desmut step. The smooth plate is then anodized.

"Sil" means the anodized plate is immersed in a sodium silicate solution to coat it with an interlayer. The coated plate is then rinsed with deionized water and dried at room temperature.

"PG" means "pumice grained." The aluminum surface is first degreased, etched and subjected to a desmut step. The plate is then mechanically grained by subjecting it to a 30% pumice slurry at 30° C., followed by a post-etching step and a desmut step. The grained plate is then anodized using DC current of about 8 A/cm$^2$ for 30 seconds in an $H_2SO_4$ solution (280 g/liter) at 30° C. The anodized plate is then coated with an interlayer.

"G20" is a printing plate substrate which is described in U.S. Pat. No. 5,368,974, the disclosure of which is incorporated herein by reference in its entirety.

"CHB" means chemical graining in a basic solution. After an aluminum substrate is subjected to a matte finishing process, a solution of 50 to 100 g/liter NaOH is used during graining at 50 to 70° C. for 1 minute. The grained plate is then anodized using DC current of about 8 A/cm$^2$ for 30 seconds in an $H_2SO_4$ solution (280 g/liter) at 30° C. The anodized plate is then coated with a silicated interlayer.

"PF" substrate has a phosphate fluoride interlayer. The process solution contains sodium dihydrogen phosphate and sodium fluoride. The anodized substrate is treated in the solution at 70° C. for a dwell time of 60 seconds, followed by a water rinse, and drying. The deposited dihydrogen phosphate is about 500 mg/m$^2$.

A "basic" surface will have a plurality of basic sites and acidic sites present, with the basic sites predominating to some degree. Similarly, an "acidic" surface will have a plurality of acidic sites and basic sites present, with the acidic sites predominating to some degree. It is known by one of ordinary skill in the art that the PG-Sil printing plate substrate appears to have a higher silicate site density than the DS-Sil printing plate substrate, and is more basic. It is also known that the G20 printing plate substrate exhibits less acidic character than AA printing plate substrates.

The ink-receptive layer produced with the fluid composition of this invention has excellent adhesion to the substrate surface, and as set forth in further detail below, the resulting printing plate exhibits extended press run length. Advantageously, the superior results of the printing plate of this invention are achieved without chemical development.

The fluid composition comprising an acidic polymeric compound and a second compound comprising a pyridyl group is preferably applied by imagewise ink jetting to the substrate surface, typically by an ink jet printer using equipment and techniques which are well known to those skilled in the art. In this manner, the substrate is imaged so that after the fluid composition dries on the substrate, an ink receptive layer is formed in the desired image on the surface of the substrate.

Non-aqueous solvents suitable for the fluid composition of this invention include diglyme (bis(2-methoxyethyl) ether), glycerol, glycols, and mixtures thereof.

The fluid composition may comprise about 0.1 to 25 weight percent, preferably about 0.1 to 7 weight percent, and most preferably about 0.1 to 4 weight percent of the acidic polymeric compound, based upon the total weight of the fluid to composition.

The fluid composition may comprise about 0.1 to 25 weight percent, preferably about 0.1 to 8 weight percent, and most preferably about 0.1 to 4 weight percent of the second compound, based upon the total weight of the fluid composition.

The acidic polymeric compound of this invention preferably comprises a poly(acrylic acid), poly(methacrylic acid), poly(maleic acid), poly(fumaric acid), poly(styrene-co-acrylic acid), poly(styrene-co-maleic acid), poly(styrene-co-fumaric acid), or mixture or derivatives thereof. The acidic polymeric compound can be a copolymer of such monomers, for example, an acrylic acid-acrylate copolymer, or an acrylic acid-maleic acid copolymer, and so forth. It may be a homopolymer, copolymer, terpolymer, and the like. By "copolymer" we mean any polymer comprised of more than one type of monomer, prepared in a copolymerization. By "terpolymer" we mean a polymer consisting essentially of three types of monomers, prepared in a copolymerization. Thus, a copolymer can include a terpolymer.

The second compound of the fluid composition of this invention preferably comprises a pyridyl group. It may be a monomeric compound, or it may be a polymeric compound.

The fluid composition does not exhibit liquid crystalline or microemulsion behavior. The presence of the pyridyl-containing compound in the fluid composition enhances the cohesion of the oleophilic layer produced by drying the fluid composition that was ink jetted onto the substrate. Without intending to be bound by any one particular theory, the strong nucleophilic character of the pyridyl-containing compound provides association to the acidic polymeric compound.

In the most preferred embodiment, the acidic polymeric compound is a polyacrylate terpolymer, $H(CH_2CHCOOH)_x(CH_2CHCOOH)_y(CH_2CHCOOH)_zH$, where x=50, y=45, and z=5, and the second compound is 4-pyridyloxyundecanoxy-4'-nitrostilbene.

Optionally, the fluid composition may contain additives, such as colorants, biocides, corrosion inhibitors, and anti-foam agents, as used by those of skill in the art of ink jet printing, without loss of the characteristic properties of this invention.

Adsorbing a surfactant to a conventional printing plate substrate, prior to application of an ink receptive layer, can improve the image resolution achieved. Such a surfactant-pretreated substrate will be termed a "printing plate precursor" herein. A printing plate may be prepared from the printing plate precursor by image-wise applying a fluid composition as described above to the substrate. In a preferred embodiment, the fluid composition is applied by means of an ink jet printer, and then dried to form an ink receptive layer in the form of the desired image. Advantageously, it is not required to Advantageously, chemical development of the printing plate is not required.

Adhesion of the ink receptive layer to the substrate after drying of the fluid composition on the substrate is not diminished substantially by the presence of the precursor plate surfactant, which tends only to slow the spreading of the fluid composition droplet deposited by the ink jet nozzle. Thus, the precursor plate surfactant can increase resolution without reducing press run length. Surfactants that can be used for the precursor include alkyl tail surfactants, fluorosurfactants and siliconated surfactants.

Illustrative examples of alkyl tail surfactants include sodium dodecylsulfate, isopropylamine salts of an alkylarylsulfonate, sodium dioctyl succinate, sodium methyl cocoyl taurate, dodecylbenzene sulfonate, alkyl ether phosphoric acid, N-dodecylamine, dicocoamine, 1-aminoethyl-2-alkylimidazoline, 1-hydroxyethyl-2-alkylimidazoline, and cocoalkyl trimethyl quaternary ammonium chloride, polyethylene tridecyl ether phosphate, and the like.

Illustrative examples of fluorosurfactants useful in preferred embodiments of the present invention and their commercial trade names are set forth in Table 2.

TABLE 2

Fluorosurfactants useful in preferred embodiments

| Trade Name | Chemical Structure | Type |
|---|---|---|
| Zonyl FSD | $F(CF_2CF_2)_{1-7}$-alkyl-$N^-R_3Cl^-$ | Cationic |
| Fluorad FC-135 | $C_8F_{17}SO_2NHC_3H_6N^+(CH_3)_3I^-$ | Cationic |
| Zonyl FSA | $F(CF_2CF_2)_{1-7}CH_2CH_2SCH_2CH_2CO_2$—$Li^+$ | Anionic |
| Fluorad FC-129 | $C_8F_{17}SO_2N(C_2H_5)CH_2CO_2^-K^+$ | Anionic |
| Zonyl FSP | $(F(CF_2CF_2)_{1-7}CH_2CH_2O)_{1,2}PO(O^-NH_4^+)_{1,2}$ | Anionic |
| Zonyl FSJ(1) | $(F(CF_2CF_2)_{1-7}CH_2CH_2O)_{1,2}PO(O^-NH_4^+)_{1,2}$ | Anionic |
| Fluorad FC-120 | $C_{10}F_{21}SO_3^-NH_4^+$ | Anionic |
| Zonyl FS-62 | $C_6F_{13}CH_2CH_2SO_3H$, $C_6F_{13}CH_2CH_2SO_3^-NH_4^+$ | Anionic |
| Zonyl FSK | $F(CF_2CF_2)_{1-7}CH_2CHOAcCH_2N^+R_2CH_2COO^-$ | Amphoteric |
| Fluorad FC-100(2) | $R^{**}SO_3^-$ | Amphoteric |
| Fluorad FC-170C | $C_8F_{17}SO_2N(C_2H_5)(CH_2CH_2O)_x$ | Nonionic |
| Fluorad FC-171 | $C_8F_{17}SO_2N(C_2H_5)(CH_2CH_2O)_xCH_3$ | Nonionic |
| Zonyl FSO(3) | $F(CF_2CF_2)_{1-7}CH_2CH_2O(CH_2CH_2O)_yH$ | Nonionic |
| Zonyl FS-300(3) | $F(CF_2CF_2)_{1-7}CH_2CH_2O(CH_2CH_2O)_zH$ ($z > y$) | Nonionic |

(1)FSJ also contains a nonfluorinated surfactant.
(2)R** contains an ammonium function.
(3)y or z = 0 to about 25.

ZONYL surfactants are commercially available from E.I. du Pont de Nemours & Co. and have a distribution of perfluoroalkyl chain length. FLUORAD surfactants are commercially available from 3M Company and have a narrow distribution of the hydrophobic chain length.

Illustrative siliconated surfactants include the following non-exhaustive listing: polyether modified poly-dimethyl-siloxane, silicone glycol, polyether modified dimethyl-polysiloxane copolymer, and polyether-polyester modified hydroxy functional polydimethyl-siloxane.

The precursor plate surfactant may be adsorbed onto the substrate by any conventional method, preferably by immersion of the substrate in an aqueous solution of the surfactant for a time, typically one minute, which is effective to permit adsorption of the surfactant upon the substrate. In a particularly preferred embodiment, any non-adsorbed surfactant is then removed from the printing plate substrate surface. Preferably, the substrate is rinsed with water to remove non-adsorbed surfactant, then dried. The resulting printing plate precursor has a surfactant on at least one surface, in an amount effective to improve the resolution of printing.

An imaged substrate prepared by imagewise applying a fluid composition to a substrate could also be used, for example, as a precursor for a printed circuit board in which conductive metals are deposited onto the imaged substrate.

The following examples are given to illustrate preferred embodiments of the present invention and are not intended to limit the invention in any way. It should be understood that the present invention is not limited to the above-mentioned embodiments. Numerous modifications can be made by one skilled in the art having the benefits of the teachings given here. Such modifications should be taken as being encompassed within the scope of the present invention as set forth in the appended claims.

EXAMPLE 1

Comparative

Fluid composition R2702-1971 was prepared by dissolving a polyacrylate terpolymer in diglyme to 1 weight percent. This fluid composition was ink-jetted with an EPSON 800 printer onto an G20 substrate (Table 1) that was pretreated with FLUORAD FC-135 precursor plate surfactant. After drying without processing or developing, the image on the substrate did not rub off with a pad impregnated with ink and water. This printing plate was used in an accelerated press trial of 10,000 impressions on paper, at which point evidence of image wear was observed. Thus, the plate was suitable only for very low volume printing. The accelerated press trial used a rubber transfer blanket of high hardness that accelerates wear of the printing plate. This fluid composition, employed on a basic silicated substrate pretreated with FLUORAD FC-135 surfactant was not suitable for commercial printing, showing wear at only about 200 impressions.

The polyacrylate terpolymer, R2886-31, was prepared in a 2 L round bottom flask connected to a condenser, having a stirrer, nitrogen feed and temperature probe. In the flask, 360 g of 1-methoxy-2-propanol (Dowanol PM) was heated to 120° C. under a nitrogen blanket. To the flask was added 120 g of acrylic acid (50%), 11 g of methylrylate (5%), 109 g butyl acrylate (45%), and 3.6 g t-butyl peroctoate initiator over a two-hour period. After 10 minutes, another 1 g of initiator was added to scrub residual monomer. The reaction was held at 120° C. for two hours, then the polymer solution was cooled and dumped. The final non-volatile content of the product was 40.5%.

A printing plate that survives an accelerated press trial of fifteen thousand impressions with no evidence of wear of the ink-receiving layer on the substrate or in the printed impressions is suitable for a variety of commercial applications. Such a plate is called suitable for "low volume" printing since a press run of fifteen thousand is a low volume commercial run. It should be noted that passing an accelerated press trial of fifteen thousand impressions with no evidence of wear means that the plate is capable of a substantially longer press run than fifteen thousand under ordinary commercial printing conditions.

A printing plate that shows evidence of wear of the ink-receiving layer on the substrate or in the printed impressions for a run of about one thousand to less than about fifteen thousand impressions is a plate that is suitable for "very low volume" printing. A printing plate that shows evidence of wear of the ink-receiving layer on the substrate or in the printed impressions for a run of less than about one thousand impressions is a plate that is not suitable for commercial printing, although it has utility to form an image.

EXAMPLE 2

Fluid composition R2702-1973 was prepared by dissolving a polyacrylate tempolymer, as described in Example 1, 0.8 weight percent, and 4-pyridyloxyundecan-1-ol (Reilly, Ltd.), 0.2 weight percent, in diglyme. This fluid composition was ink-jetted with an EPSON 800 printer onto a G20 substrate (Table 1) that was pretreated with FLUORAD FC-135 precursor plate surfactant. After drying without processing or developing, the image on the substrate did not rub off with a pad impregnated with ink and water. This printing plate was used in an accelerated press trial of 10,000 impressions on paper, at which point evidence of image wear was observed. Thus, the plate was suitable only for very low volume printing. The accelerated press trial used a rubber transfer blanket of high hardness that accelerates wear of the printing plate. This fluid composition, employed on AA substrate (Table 1) that was pretreated with FLUORAD FC-120 precursor plate surfactant, was also suitable for very low volume printing, surviving an accelerated press trial of 14,000 impressions on paper with some wear. This fluid composition, employed on basic substrate DS-Sil (Table 1) pretreated with FLUORAD FC-135 surfactant, was not suitable for commercial printing, showing wear in an accelerated press trial of only about 1000 impressions on paper.

The compound 4-pyridyloxyundecan-1-ol was prepared as follows: To a solution of 4-hydroxy-pyridine (5.71 g, 60 mmol) in DMF (150 $cm^3$) was added cesium carbonate (19.56 g, 60 mmol). The mixture was heated to 90° C. for 5 mins then 11-bromoundecanol (12.56 g, 50 mmol) was added and the mixture heated to reflux temperature (125° C.) for 15 hours. After cooling, the contents of the flask were poured into rapidly stirring distilled water (800 $cm^3$). A pale yellow precipitate formed which was filtered and dried (in air). Recrystallization from hexane gave white crystals of 4-pyridyloxyundecan-1-ol (2.9 g, 22%).

EXAMPLE 3

Fluid composition R2702-1972 was prepared by dissolving a polyacrylate terpolymer, as described in Example 1, 0.8 weight percent, and 4-pyridyloxyundecanoxy-4'-nitrostilbene, 0.2 weight percent, in diglyme. This fluid composition was ink-jetted with an EPSON 800 printer onto a G20 substrate (Table 1) that was pretreated with FLUORAD FC-135 precursor plate surfactant. After drying without processing developing, the image on the substrate did not rub off with a pad impregnated with ink and water. This printing plate was used in an accelerated press trial of 20,000 impressions, at which point no evidence of image wear was observed. Thus, the plate was suitable for low volume printing. The accelerated press trial used a rubber transfer blanket of high hardness that accelerates wear of the printing plate. This fluid composition was suitable only for very low volume printing, showing wear at about 3,000 impressions and 1000 impressions on PG-Sil and DS-Sil substrates (Table 1), respectively, that were pretreated with FLUORAD FC-135 precursor plate surfactant.

The compound 4-pyridyloxyundecanoxy-4'-nitrostilbene was prepared as follows:

Step 1

Synthesis of pyridyl-4-oxy-undecanoxy-methanesulphonate. Pyridyl-4-oxy-undecanol (6.8 g, 25.66 mmol) was dissolved in dry dichloromethane (150 $cm^3$) and cooled to 0° C. in an ice-bath. To the solution was added triethylamine (5.36 $cm^3$, 38.49 mmol) and methane sulphonylchloride (2.18 $cm^3$, 28.23 mmol) dropwise over 5 minutes. The resultant yellow/orange mixture was allowed to stir for 6 hours before being extracted with dichloromethane (3×100 $cm^3$), washed with a solution of potassium hydrogen carbonate (2×300 $cm^3$, 10% w/v) and then water. Upon solvent removal, an orange solid formed which was recrystallised from hexane (3×) to give pyridyl-4-oxy-undecanoxy-methanesulphonate (5.6 g, 64%) as fluffy white crystals.

Step 2

Synthesis of 4-hydroxybenzylidene-aniline. A solution of hydroxy benzaldehyde (5.00 g, 41 mmol) in toluene (200 $cm^3$) was heated to 109° C. before aniline (1.86 g, 20 mmol) was added under nitrogen. The mixture was then allowed to cool, forming a yellow solid after 30 minutes. The reaction was continued with the further addition of aniline (1.86 g, 20 mmol). Dean and Stark apparatus was used to collect water (0.6 $cm^3$). Reflux continued for a further 5 hours by which time 0.7 $cm^3$ of water had collected. After cooling the mixture, a thick crystalline mass was formed which was filtered and dried under vacuum at 90° C. to give 4-hydroxybenzylidene-aniline (7.3 g, 94%) as pale cream crystals.

Step 3

Synthesis of 4-Hydroxy-4'-nitro-stilbene. Nitrophenylacetic acid (4.53 g, 25 mmol) and glacial acetic acid (21.4 $cm^3$, 375mmol) were stirred together for 5 minutes. This was followed by the addition of 4-hydroxybenzylidene-aniline (4.9 g, 25 mmol). The resultant orange mixture was heated to 50° C. to give a clear solution. After 48 hours an orange solid crystallized out of the mixture which was filtered, dried and recrystallized from acetonitrile to give 4-hydroxy-4'-nitrostilbene (72%) as orange crystals.

Step 4

Synthesis of potassium phenoxide of 4-hydroxy-4'-nitro-stilbene. 4-Hydroxy-4'-nitro-stilbene (15 g, 62.5 mmol) was placed in refluxing ethanol at 79° C. (200 $cm^3$) to give an orange solution. Dropwise addition of aqueous potassium hydroxide solution (3.82 g, 15% w/v) over a period of 10 minutes resulted in a dark blue/red mixture which was allowed to cool and stirred at room temperature for 12 hours. The resultant blue crystals were filtered and washed with THF before vacuum drying at 60° C. for 24 hours to give the potassium phenoxide of 4-hydroxy-4'-nitrostilbene (17.0 g, 98%) as dark blue crystals.

Step 5 synthesis of 4-pyridyloxyundecanoxy-4'-nitrostilbene. To the potassium phenoxide of 4-hydroxy-4'-nitrostilbene (1.55 g, 5.6 mmol) in acetonitrile (160 $cm^3$) was added 18-crown-6-ether (0.03 g, 0.12 mmol). The resultant blue mixture was heated to reflux (82° C.) under nitrogen. This was followed by the addition of pyridyl-4-oxyundecanoxy-methanesulphonate 92.0 g, 4.6 mmol) in acetonitrile (80 $cm^3$) dropwise over 60 minutes. A colour change from blue to purple to yellow was observed. After 16 hours the reaction mixture was allowed to cool to room temperature, the yellow solid filtered off, dried and recrystallized from acetone/water (3×) to give 4-pyridyloxyundecanoxy-4'-nitrostilbene (1.46 g, 65%) as yellow crystals. For this preparation, all raw materials were supplied by Aldrich, Inc., and used as received.

EXAMPLE 4

Fluid composition R2702-1976 was prepared by dissolving a polyacrylate terpolymer, as described in Example 1, 0.5 weight percent, and 4-pyridloxyundecan-1-ol, as described in Example 2, 0.5 weight percent, in diglyme. This fluid composition was inkjetted with an EPSON 800 printer onto a G20 substrate (Table 1) that was pretreated with FLUORAD FC-135 precursor plate surfactant. After drying without processing or developing, the image on the substrate did not rub off with a pad impregnated with ink and water. This printing plate was used in an accelerated press trial of 5,000 impressions on paper, at which point evidence of image wear was observed. Thus, the plate was suitable only for very low volume printing. The accelerated press trial used a rubber transfer blanket of high hardness that accelerates wear of the printing plate. This fluid composition, employed on AA substrate (Table 1) that was pretreated with FLUORAD FC-120 precursor plate surfactant was suitable for very low volume printing, showing wear at 10,000 impressions on paper, and was not suitable for printing at all on AA substrate (Table 1) that was pretreated with FLUORAD FC-129 precursor plate surfactant.

EXAMPLE 5

Fluid composition R2702-1974 was prepared by dissolving a polyacrylate terpolymer, as described in Example 1, 0.5 weight percent, and 1,3-di(4-pyridyl)propane (Reilly Ind.), 0.5 weight percent, in diglyme. This fluid composition was ink-jetted with an EPSON 800 printer onto a G20 substrate (Table 1) that was pretreated with FLUORAD FC-135 precursor plate surfactant. After drying without processing or developing, the image on the substrate did not rub off with a pad impregnated with ink and water. This printing plate was used in an accelerated press trial of 5,000 impressions, at which point evidence of image wear was observed. Thus, the plate was suitable only for very low volume printing. The accelerated press trial used a rubber transfer blanket of high hardness that accelerates wear of the printing plate. This fluid composition, employed on a basic silicated substrate that was pretreated with FLUORAD FC-135 precursor plate surfactant was not suitable for commercial printing, showing wear at only 500 impressions, and was not suitable for printing at all on AA substrate (Table 1) that was pretreated with FLUORAD FC-129 precursor plate surfactant.

EXAMPLE 6

Fluid composition R2702-1975 was prepared by dissolving a polyacrylate terpolymer, R2866-31, as described in Example 1, 0.24 weight percent, and 4-pyridyloxyundecanoxy-4'-nitrostilbene, R2884-28, as described in Example 3, 0.76 weight percent, in diglyme. This fluid composition was ink-jetted with an EPSON 800 printer onto G20 substrate (Table 1) that was pretreated with FLUORAD FC-135 precursor plate surfactant, and an AA substrate (Table 1) that was pretreated with FLUORAD FC-120 precursor plate surfactant, and an AA substrate (Table 1) that was pretreated with FLUORAD FC-129 precursor plate surfactant. After drying without processing or developing, the image on the substrate did not rub off with a pad impregnated with ink and water. These printing plates were used in accelerated press trials of over 23,000 impressions on paper, at which point no evidence of image wear was observed. Thus, the plates were suitable for low volume printing. The accelerated press trial used a rubber transfer blanket of high hardness that accelerates wear of the printing plate. This fluid composition, employed on on a basic silicated substrate that was pretreated with FLUORAD FC-135 precursor plate surfactant was not suitable for commercial printing, showing wear at only 200 impressions.

EXAMPLE 7

A polyacrylate terpolymer as described in Example 1 is mixed in equal parts with 4-pyridyloxyundecanoxy-4'-nitrostilbene and is applied by hot melt ink jet onto a roughened aluminum substrate.

EXAMPLE 8

A fluid composition as described in Example 3 is prepared and is ink jetted onto a substrate. Orientational ordering showing the presence of a liquid crystalline phase is determined by optical dichroism of a small amount of dye molecule trans-dimethylaminonitrostilbene dissolved in the fluid composition.

The invention claimed is:

1. A fluid composition comprising:

(a) an acidic polymeric compound selected from the group consisting of poly(acrylic acid), poly (methacrylic acid), poly(maleic acid), poly(fumaric acid), poly(styrene-co-acrylic acid), poly(styrene-co-maleic acid), poly(styrene-co-fumaric acid), and mixtures thereof;

(b) a second compound which is a liquid crystalline compound which comprises a pyridyl group and optionally, a nitrostilbene moiety; and (c) a non-aqueous solvent, wherein the fluid composition is further characterized in that, upon imagewise ink jetting the fluid composition onto a substrate and volatilization of the solvent the remaining portion of the fluid composition comprises a liquid crystalline phase.

2. The fluid composition of claim 1, wherein said second compound is a liquid crystalline compound comprising a nitrostilbene moiety and a pyridyl moiety.

3. The fluid composition of claim 1, in which said second compound is a pyridyl liquid crystal.

4. The fluid composition of claim 1, in which said second compound is 4-pyridyloxyundecanoxy-4'-nitrostilbene.

5. The fluid composition of claim 1, in which said non-aqueous solvent is diglyme.

6. The fluid composition of claim 1, wherein said acidic polymeric compound is present in an amount from 0.1 to 25 weight percent based upon the total weight of the fluid composition.

7. The fluid composition of claim 6, wherein said acidic polymeric compound is present in an amount from 0.1 to 7 weight percent based upon the total weight of the fluid composition.

8. The fluid composition of claim 7, wherein said acidic polymeric compound is present in an amount from 0.1 to 4 weight percent based upon the total weight of the fluid composition.

9. The fluid composition of claim 1, wherein said second compound is present in an amount from 0.1 to 25 weight percent based upon the total weight of the fluid composition.

10. The fluid composition of claim 9, wherein said second compound is present in an amount from 0.1 to 8 weight percent based upon the total weight of the fluid composition.

11. The fluid composition of claim 10, wherein said second compound is present in an amount from 0.1 to 4 weight percent based upon the total weight of the fluid composition.

12. A printing plate prepared by a process comprising:

(a) providing a substrate; and (b) imagewise applying by ink jetting to the substrate a fluid composition comprising:

(i) an acidic polymeric compound selected from the group consisting of poly(acrylic acid), poly (methacrylic acid), poly(maleic acid), poly(fumaric acid), poly(styrene-co-acrylic acid), poly(styrene-co-maleic acid), poly(styrene-co-fumaric acid), and mixtures thereof;

(ii) a second compound which is a liquid crystalline compound which comprises a pyridyl group and optionally, a nitrostilbene moiety; and (iii) a non-aqueous solvent; in which subsequent to imagewise ink jetting the fluid composition onto the substrate and volatilization of the solvent a portion of the fluid composition comprises a liquid crystalline phase.

13. The printing plate of claim 12, in which the printing plate is dried subsequent to application of the fluid composition.

14. The printing plate of claim 12, in which a surfactant is applied to at least one surface of the substrate to provide a printing plate precursor, said surfactant being selected from the group consisting of alkyl tail surfactants, fluorosurfactants and siliconated surfactants.

15. A printing plate comprising:

(a) a substrate; and (b) imaged areas comprising a liquid crystalline phase which includes:

(i) an acidic polymeric compound selected from the group consisting of poly(acrylic acid), poly (methacrylic acid), poly(maleic acid), poly(fumaric acid), poly(styrene-co-acrylic acid), poly(styrene-co-maleic acid), poly(styrene-co-fumaric acid), and mixtures thereof; and (ii) a second compound which is a liquid crystalline compound which comprises a pyridyl group and optionally, a nitrostilbene moiety.

16. The printing plate of claim 15, in which a surfactant is applied to at least one surface of the substrate to provide a printing plate precursor, said surfactant being selected from the group consisting of alkyl tail surfactants, fluorosurfactants and siliconated surfactants.

17. A method of forming an image onto a substrate comprising:

(a) providing a substrate;

(b) imagewise applying by ink jetting to the substrate a fluid composition comprising:

(i) an acidic polymeric compound selected from the group consisting of poly(acrylic acid), poly (methacrylic acid), poly(maleic acid), poly(fumaric acid), poly(styrene-co-acrylic acid), poly(styrene-co-maleic acid), poly(styrene-co-fumaric acid), and mixtures thereof;

(ii) a second compound which is a liquid crystalline compound which comprises a pyridyl group and optionally, a nitrostilbene moiety.

(iii) a non-aqueous solvent wherein the fluid composition is further characterized in that, upon imagewise ink jetting the fluid composition onto the substrate and volatilization of the solvent the remaining portion of the fluid composition comprises a liquid crystalline phase, wherein the fluid composition forms the image; and (c) drying the fluid composition on the substrate.

18. An imaged substrate comprising:

(a) a substrate; and (b) imaged areas comprising a liquid crystalline phase which includes:

(i) an acidic polymeric compound selected from the group consisting of poly(acrylic acid), poly (methacrylic acid), poly(maleic acid), poly(fumaric acid), poly(styrene-co-acrylic acid), poly(styrene-co-maleic acid), poly(styrene-co-fumaric acid), and mixtures thereof; and (ii) a second compound which is a liquid crystalline compound which comprises a pyridyl group and optionally, a nitrostilbene moiety.

19. A printing plate prepared by a process comprising:

(a) providing a substrate;

(b) applying by hot melt ink jetting to the substrate a mixture comprising:

(i) an acidic polymeric compound selected from the group consisting of poly(acrylic acid), poly (methacrylic acid), poly(maleic acid), poly(fumaric acid), poly(styrene-co-acrylic acid), poly(styrene-co-maleic acid), poly(styrene-co-fumaric acid), and mixtures thereof; and (ii) a second compound which is a liquid crystalline compound which comprises a pyridyl group and optionally, a nitrostilbene moiety.

20. The printing plate of claim 19, wherein said second compound is a liquid crystalline compound comprising a nitrostilbene moiety and a pyridyl moiety.

21. The printing plate of claim 19, in which said second compound is a pyridyl liquid crystal.

22. The printing plate of claim 19, in which said second compound is 4-pyridyloxyundecanoxy-4'-nitrostilbene.

23. A method of copying an image onto a medium comprising:

(a) providing a substrate;

(b) applying by ink jetting to the substrate a fluid composition comprising:

(i) an acidic polymeric compound selected from the group consisting of poly(acrylic acid), poly (methacrylic acid), poly(maleic acid), poly(fumaric acid), poly(styrene-co-acrylic acid), poly(styrene-co-maleic acid), poly(styrene-co-fumaric acid), and mixtures thereof;

(ii) a second compound which is a liquid crystalline compound which comprises a pyridyl group and optionally, a nitrostilbene moiety; and (iii) a non-aqueous solvent wherein the fluid composition is further characterized in that, upon imagewise ink jetting the fluid composition onto the substrate and volatilization of the solvent the remaining portion of the fluid composition comprises a liquid crystalline phase, wherein the fluid composition forms the image;

(c) drying the fluid composition on the substrate;

(d) contacting the dried formed image with an ink thereby coating the formed image with the ink; and (e) contacting the formed image coated with the ink with a medium capable of receiving the ink in the form of the image.

* * * * *

UNITED STATES PATENT AND TRADEMARK OFFICE
CERTIFICATE OF CORRECTION

PATENT NO. : 6,359,056 B1

DATED : March 19, 2002
INVENTOR(S) : Aurenty et al.

It is certified that error appears in the above-identified patent and that said Letters Patent is hereby corrected as shown below:

Title page,
Item [56], References Cited, OTHER PUBLICATIONS, under Yada et al., "Influrence" should read -- Influence --

Column 3,
Table 1, "acid/acryTamide" should read -- acid/acrylamide --

Column 6,
Line 1, "Advantageously, it is not required to" should be deleted
Table 2, under 'Chemical Structure' for 'Zonyl FSD': "$N^-$" should read -- $N^+$ --

Column 8,
Line 11, "tempolymer" should read -- terpolymer --

Column 9,
Line 31, "-Hydroxy-" should read -- hydroxy- --
Line 53, "synthesis" should read -- Synthesis --

Column 10,
Line 4, "4-pyridloxyundecan-1-ol," should read -- 4-pyridyloxyundecan-1-ol, --

Column 11,
Line 1, "on" (second occurrence) should be deleted

Column 12,
Line 59, "moiety." should read -- moiety; and --

UNITED STATES PATENT AND TRADEMARK OFFICE
CERTIFICATE OF CORRECTION

PATENT NO. : 6,359,056 B1
DATED : March 19, 2002
INVENTOR(S) : Aurenty et al.

It is certified that error appears in the above-identified patent and that said Letters Patent is hereby corrected as shown below:

Column 13,
Line 15, "substrate;" should read -- substrate; and --
Line 26, "moiety." should read -- moiety; in which subsequent to imagewise ink jetting the mixture onto the substrate and cooling of the mixture on the substrate a portion of the mixture comprises a liquid crystalline phase. --

Signed and Sealed this

Twenty-ninth Day of October, 2002

*Attest:*

JAMES E. ROGAN

*Attesting Officer*

*Director of the United States Patent and Trademark Office*